United States Patent [19]

Grantham

[11] Patent Number: 5,122,894
[45] Date of Patent: Jun. 16, 1992

[54] ELECTRO-OPTIC BEAM DEFLECTION

[75] Inventor: Daniel H. Grantham, Glastonbury, Conn.

[73] Assignee: United Technologies Corporation, Hartford, Conn.

[21] Appl. No.: 431,495

[22] Filed: Nov. 3, 1989

[51] Int. Cl.$^5$ .......................... G02F 1/03; G02F 1/01; G02F 1/29; G02F 1/035

[52] U.S. Cl. ............................ 359/245; 359/248; 359/251; 359/279; 359/302; 359/315; 385/3; 385/8; 385/14; 385/131; 357/4; 357/58

[58] Field of Search ............... 350/355, 356, 354, 374, 350/380, 386, 389, 96.11, 96.13, 96.14; 357/4, 58; 359/245, 248, 251, 279, 302, 315; 385/3, 8, 14, 131

[56] References Cited

U.S. PATENT DOCUMENTS

| | | | |
|---|---|---|---|
| 3,741,626 | 6/1973 | Wentz | 359/245 |
| 4,518,934 | 5/1985 | Venkatesan | 350/355 |
| 4,755,036 | 7/1988 | Suzuki et al. | 350/355 |
| 4,771,169 | 9/1988 | Boatmun | 365/114 |

*Primary Examiner*—Eugene R. LaRoche
*Assistant Examiner*—Evelyn A. Lester

[57] ABSTRACT

An optical deflection device for manipulating optical beams employs a set of layers having the configuration NUPUN . . . , where the N and P symbols refer to N-type and P-type dopants and the U symbol refers to an electrooptically active optical guide layer having an index of refraction sufficiently higher than that of the N- and P- layers that light is guided within it and a free electron concentration low enough that the guide layers are depleted, so that light is guided within the layers with low loss, while the N- and P- layers have an appropriate bias applied to establish a differential phase shift between layers to deflect emitted radiation along a desired angle.

8 Claims, 3 Drawing Sheets

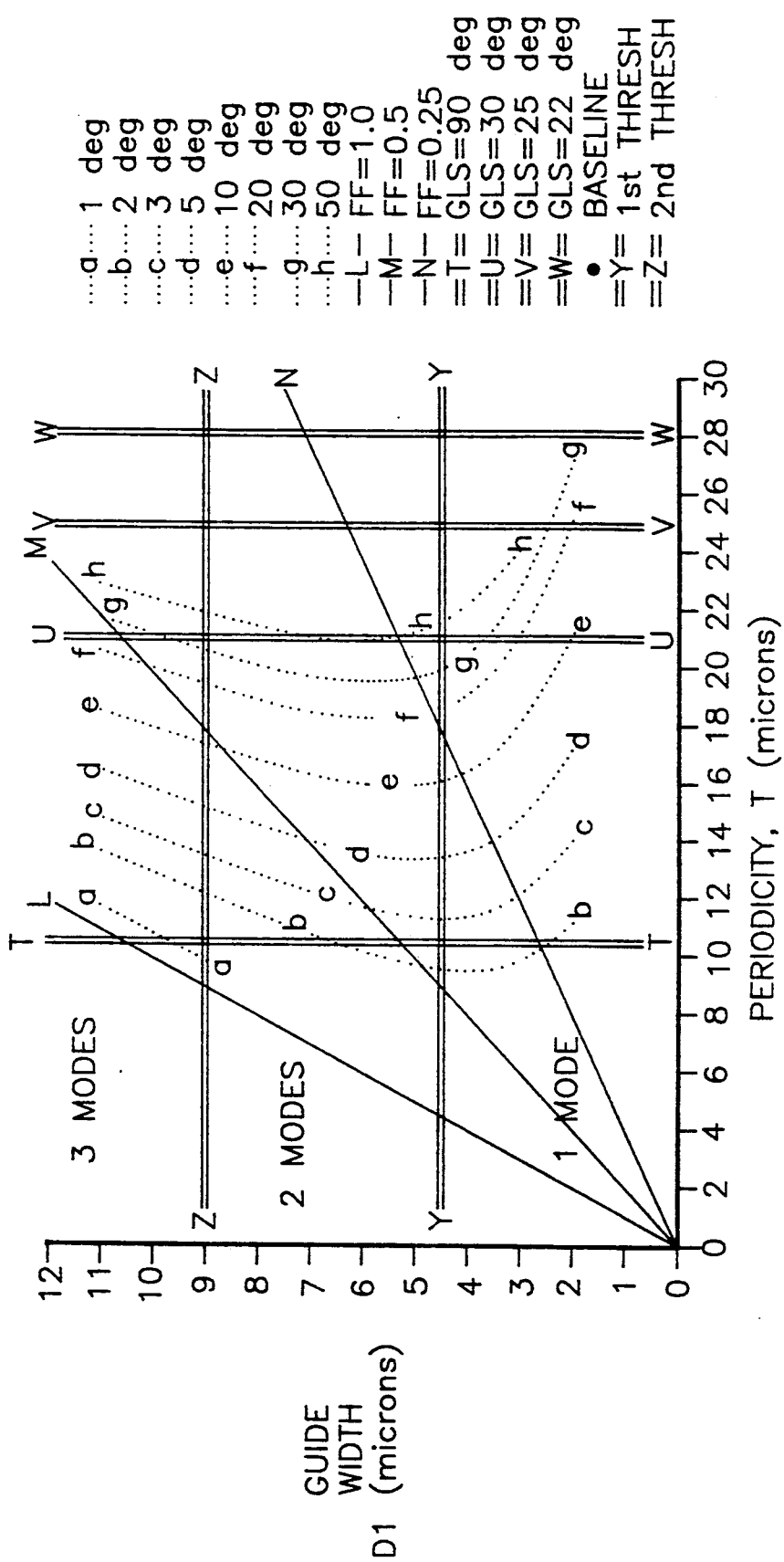

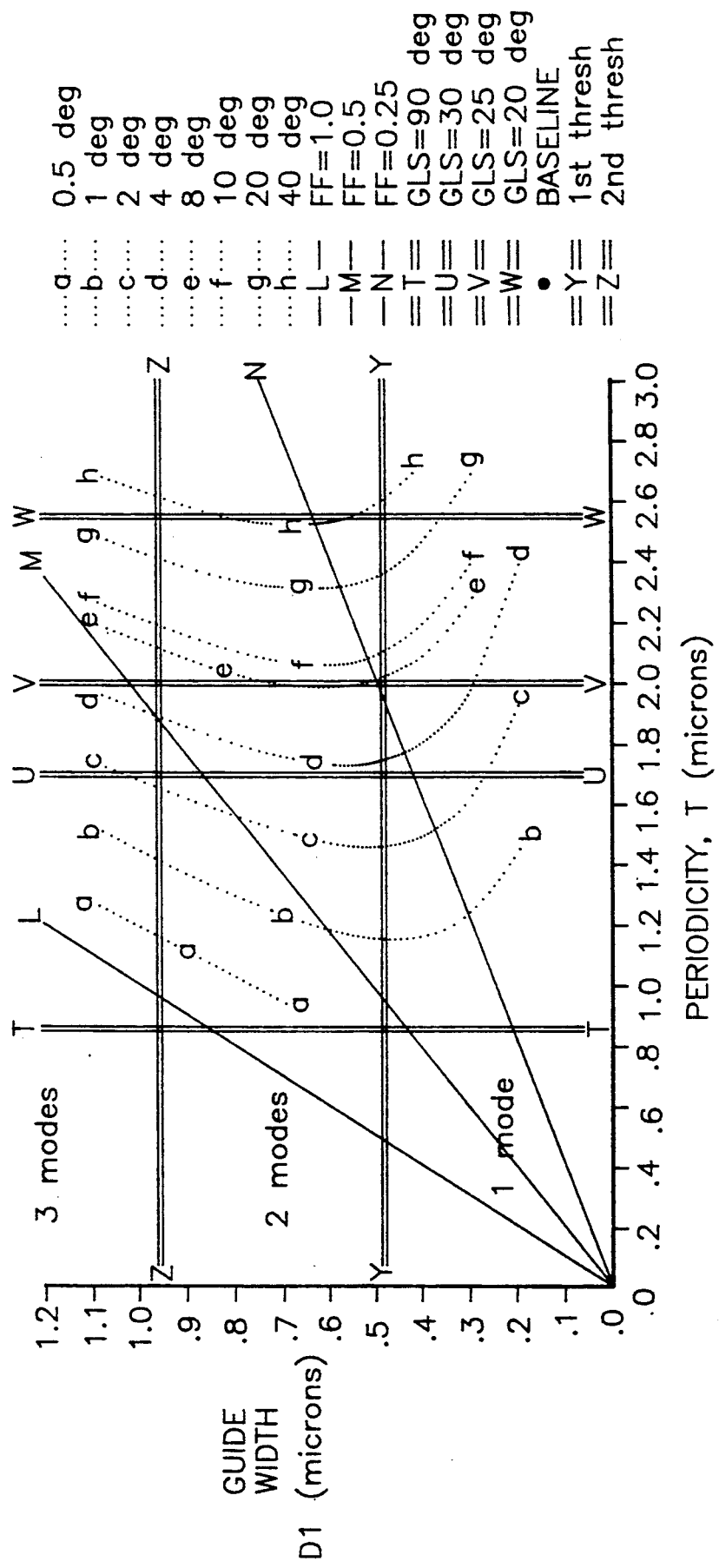

ELECTRO-OPTIC BEAM DEFLECTION

The Government has rights in the invention pursuant to a contract awarded by the Department of the Air Force.

DESCRIPTION

1. Technical Field

The field of the invention is that of manipulating optical beams through electro-optic devices.

2. Background Art

The use of phased array antennas in microwave radar systems has long been known in the art. These devices operate by having a large number of radiative elements whose relative phases are manipulated so that the net exiting beam will interfere constructively along a desired direction. The advantages of such electrical steering of a beam are well known in the art. The art of optical beam manipulation, used in laser radar and other applications, has long sought a similar device scaled down to have a size suitable for use with optical beams. This has proven to be a very difficult task. One device in the prior art using electro-optic beam control is illustrated in U.S. Pat. No. 4,771,169 issued to Boatmun, in which a parallel load serial readout shift register is formed from a combination of GaAs and AlGaAs. The GaAs is positioned between two layers of AlGaAs, the AlGaAs being doped with a higher concentration of dopant to form electrodes and having a lower index of refraction so that a beam traveling through the GaAs layer is confined between the two AlGaAs layers. This device operates by acting as a solid state diode with current flowing through the optically active GaAs layer, which is necessarily doped in order to make it semiconducting. Both the GaAs and the AlGaAs layers are doped to form diodes that are forward biased. This device has only two channels for transmission and does not deflect the beam or change the angle of propagation, only serving to impose a 180 degree phase shift to make the beams interfere to form binary ones and zeros in the far field. The art has found that the doping required to make diodes such as those shown in Boatmun increases the amount of optical beam power absorbed to the extent that the devices are not suitable for many applications. Large electrical power dissipation will also be characteristic of devices having this structure.

Since the light being confined within the GaAs layer has an evanescent field that decreases exponentially within the confining AlGaAS layer, there is a serious problem with cross-talk in devices having a multiplicity of layers. This cross-talk problem is seriously aggravated when it is necessary to change the field in the GaAs layer modulo 2 pi, because the change in field that results when the phase is to be changed from a value just below 2 pi to just above zero produces a sharp change in field between adjacent layers, in contrast to the small field changes required to provide a small relative phase change between adjacent layers. This sharp change in field has caused considerable difficulty in producing acceptable beam quality output.

A further difficulty known to those skilled in the art is that, if the radiation in the separate slabs travels at the same speed; i.e., if the phase fronts move in parallel through the slabs, conventional "synchronous theory" predicts that the device performance will be seriously degraded because small defects or inhomogeneities enhance the cross talk and degrade the output phase front. The known practical limitations in achieving compositional uniformity (i.e., refractive index), layer thickness uniformity and defect free epitaxial growth of the layers would introduce phase errors that would prevent fabrication of a useful device if conventional theory were accurate.

Since a straightforward analog to the microwave phased array system has been found not to work, those skilled in the art have long sought a method or an apparatus that will provide solid state optical beam deflection.

DISCLOSURE OF INVENTION

The invention relates to an improved optical modulator for manipulating optical beams by use of the electro-optic effect, in which an undoped layer of semiconductor material serves as the optical channel and is bracketed between two doped layers that are biased and doped with the appropriate polarity dopant to form a reverse-biased P-N junction having a depletion layer that extends throughout the guiding layer to sweep out electrons or free carriers within the guiding layer.

A feature of the invention is the unexpected result that interference between neighboring waveguide slabs is much less than expected, resulting in better than expected optical quality.

Another feature of the invention is that leakage between neighboring slabs appears as background noise, rather than interfering coherently.

Another feature of the invention is the unexpected insensitivity of coupled orthogonal devices used for two-dimensional scanning to the presence of intermediate optical devices for coupling radiation from the first device to the second device.

Other features and advantages will be apparent from the specification and claims and from the accompanying drawings which illustrate an embodiment of the invention.

BRIEF DESCRIPTION OF DRAWINGS

FIG. 3 illustrates parameter values for constructing embodiments of the invention at a wavelength of 10.6 microns.

FIG. 5 illustrates parameter values for constructing embodiments of the invention at a wavelength of 0.85 microns.

BEST MODE FOR CARRYING OUT THE INVENTION

Figure 1:
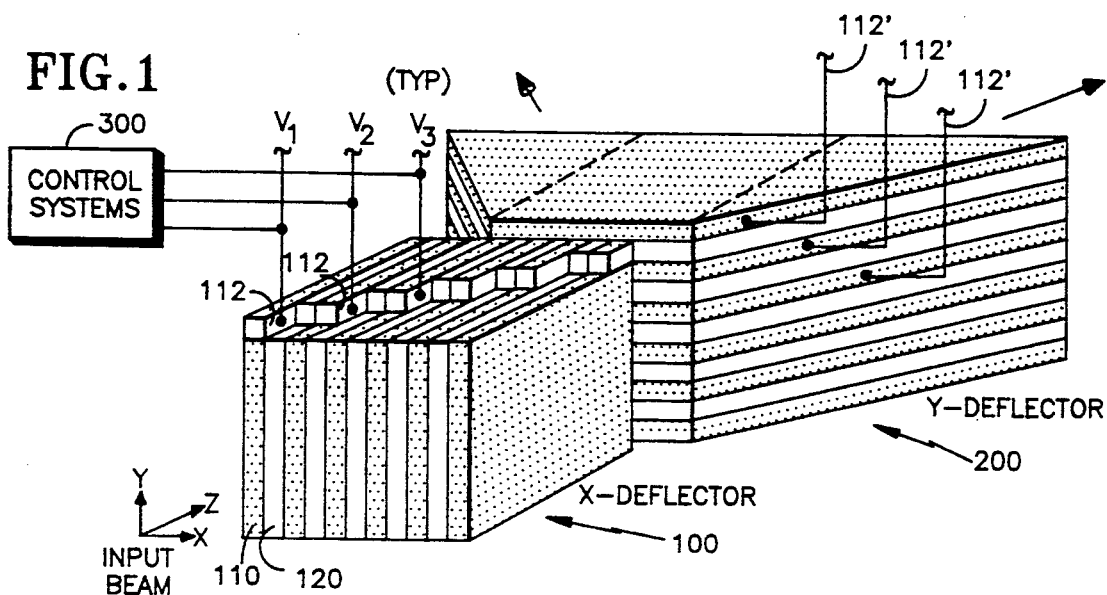
FIG. 1 illustrates a perspective view of an embodiment of the invention.

An embodiment of the invention is illustrated in perspective in FIG. 1 showing a scanner 100 which deflects an incoming beam traveling along the Z axis in the X direction and is followed by a Y deflector 200 oriented at right angles to deflect the beam in the Y direction. The Y deflector is shown with a larger opening angle to compensate for the range of angles along the X direction of the beam entering the Y deflector. The amount of angular increase is exaggerated for clarity. For simplicity in the drawing, coupling devices for coupling radiation between deflectors 100 and 200 are omitted in this drawing. These details are disclosed more conveniently in FIG. 4.

Voltages are applied to successive electrodes 112, which denote an ohmic contact on the surface of layer 110. Layer 110 is a doped AlGaAs layer having a composition $Al_xGa_{1-x}As$ where x is chosen to provide the required index of refraction to contain the light within the GaAs layer 120. Alternate layers 110 are doped P and N in succession to form the required reverse biased P-N junctions, (or in more detail P-I-N junction in which the undoped layer 120 is the I insulating layer). Control system 300 applies a set of tailored voltages to the several layers to impose an electric field alternating in sign between neighboring layers to establish reverse-biased P-N junctions enclosing each guide layer. Additional leads are shown schematically as 112' to control the layers in device 200 by controller 300. The applied voltages are preferably not uniform, but vary in magnitude to compensate for inevitable fluctuations in guide layer composition, thickness, etc. The guiding layers 120 have the higher index and the buffer layers have the lower index to confine the optical energy propagating through the guiding layers by total internal reflection.

Figure 2:
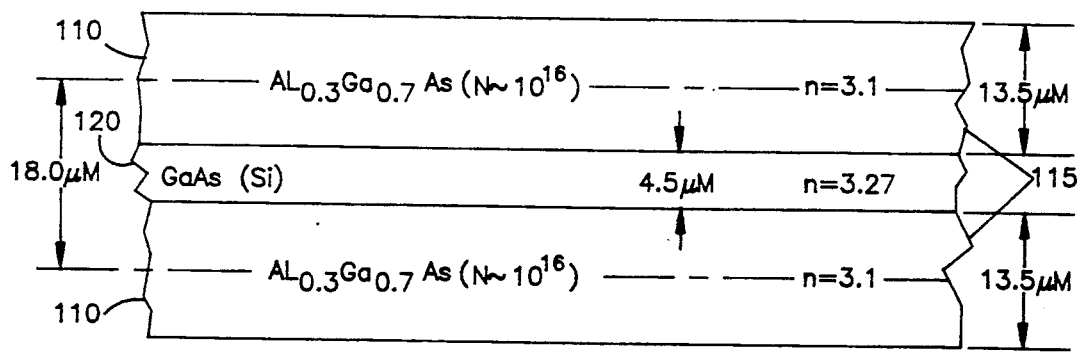
FIG. 2 illustrates in cross-section, a portion of the embodiment of FIG. 1.

FIG. 2 illustrates in cross-section, two layers 110 bracketing a layer 120. This embodiment was constructed to carry 10.6 micron $CO_2$ radiation. Devices constructed for different wavelength radiation will have correspondingly different dimensions. In this example, each layer 110 had a thickness of 13.5 microns and was doped to the amount $10^{16}$ and had a value of X of 0.3 giving an index of refraction of 3.1. The layer 120 had a thickness of 4.5 microns and an index refraction of 3.27. The center to center distance between layers 110 was 18.0 microns. With this device, only one propagating mode, $TE_0$, was supported.

If a uniform beam strikes the front surface, a fraction of it will be wasted because it strikes the buffer layers and is simply absorbed. The incoming beam may be coupled into the front surface of deflector 100 by cylindrical lenses formed by conventional ion exchange techniques. Such coupling would improve the efficiency of the device, but is not essential. The fraction of power that passes into the guiding layers is referred to as the fill factor and is the ratio of guide thickness to periodicity. The fraction of guided power in the main diffraction lobe of the output beam is also equal to the fill factor. Thus, for the embodiment illustrated in which the fill factor is one quarter; one quarter of the laser beam penetrates into the guiding layers and one quarter of the guided power is in the main lobe, so that a single device deflects in the desired direction only one sixteenth of the incoming power. In the two dimensional scanner illustrated in FIG. 1, there is another attenuation factor of one quarter caused by coupling between deflector 100 and deflector 200.

Figure 4:
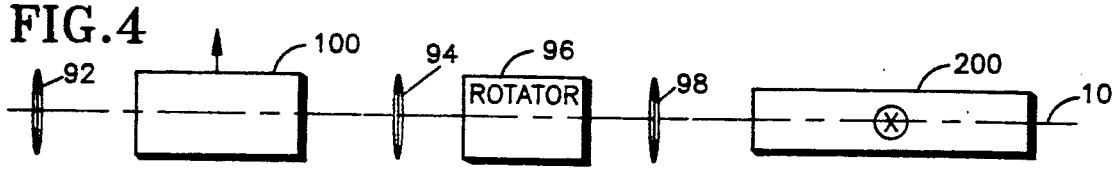
FIG. 4 illustrates a side view of the coupling of two devices in FIG. 1.

Referring now to FIG. 4, there is shown a side view of the embodiment of FIG. 1, including additional optical elements for coupling between the two deflectors 100 and 200. An input beam not shown in the figure for simplicity enters from the left along first axis 10 and is coupled into the left edge of deflector 100 by lens 92, which is illustratively placed so that its image plane is at the left surface of deflector 100. In this drawing, the slabs of deflector 100 are aligned vertically, i.e. in the plane of the paper, so that the radiation passing through will be polarized in the plane of the paper. This axis will be referred to as the first transverse axis. Radiation emitted from deflector 100 is collimated by lens 94 and passes through polarization rotator 96, which rotates the plane of polarization by ninety degrees to point along a second transverse axis, which is perpendicular to the plane of the paper in the Figure, as indicated by the conventional X in a circle symbol. Other embodiments of the invention may be constructed with axes that are not orthogonal, if that should be desired. That radiation is then coupled into deflector 200 by lens 98, which is illustratively positioned so that its image plane is at the right edge of deflector 200. With this arrangement, radiation from the output face of deflector 100 is superimposed on relayed to the output face of deflector 200.

This arrangement has the unexpected characteristic that the optical elements have essentially no effect on the phase information imposed on the beam by deflector 100. Additionally, it has turned out that the operation of the device is surprisingly insensitive to lens location. One would have expected a rather sensitive dependence of coupling efficiency on the position of the image planes with respect to the faces of the deflectors. The best performance has been found to be the above-described arrangement in which radiation from the output face of deflector 100 is relayed to the output face of deflector 200.

In a device for practical applications, there will be a great many such guiding layers, on the order of 100 or even 1000. There will be a phase shift between adjacent guiding layers which is determined by the desired deflection angle. In the case of many layers, the combination of a number of small phase shifts will exceed 2 pi. In that case, there is no need to keep on increasing the field across the guiding layer because the phase repeats after 2 pi. If the field were increased indefinitely, there would be electrical breakdown within the guiding layer. Thus, it is necessary as a practical matter that the field be shifted when the phase shift reaches 2 pi. This has the unfortunate consequence that there is now a substantial change in the field between adjacent layers as well as a substantial change in the phase difference between adjacent layers in a way that changes the coupling between these layers drastically compared to the coupling between layers that differ only by a small amount in phase and field.

A number of different semiconductor materials can be used in this device, such as InAs/InGaAs, $Al_xGa_{1-x}As/Al_yGa_{1-y}As$, InAs/GaAs, and others that will be evident to those skilled in the art in the light of this disclosure.

The GaAs and AlGaAs combination is one of such a number. GaAs has a nominal band edge absorption limit of 0.86 microns and the band edge of AlGaAs is smaller decreases monotonically as a function of X. Where X =0.3, used in the embodiment illustrated, the band edge has moved to 0.69 microns. Suitable adjustment of the Al:Ga ratio, known to those skilled in the art, can be made to move the band edge of one or both layers away from the beam wavelength being used.

A convenient dopant for the N type layers is silicon and for P type layers zinc. The holes in the P type layers have a mobility of 1/18 that of the N type layers, which impacts the resistivity of the layers and the maximum scanning rate of the device. A basic cell of the device may be denoted symbolically by NUPUN representing an NUP cell and a PUN cell, with the P layer in common. These basic cells may be stacked indefinitely, so long as good crystal quality can be maintained.

As is usually the case in a complex system, many different factors are interrelated. FIG. 3 illustrates different possibilities and tradeoffs for a 10.6 micron device. This plot was obtained through the use of simplifying assumptions, of course, and indicates an initial set of values to be refined for a particular application, rather than a set of final design parameters. The dotted lines in the center of the Figure reflect the degree of deflection. The large horizontal bands refer to the presence of 1, 2 or 3 modes in the guided layers. The diagonal lines extending from the origin refer successively to a fill factor of ¼, ½ and 1, reading from the bottom up. The horizontal double lines refer to GLS (grating lobe spacing), the angle between the main lobe and the nearest grating lobe. The lowest line corresponds to 10 degrees and the next one corresponds to 25 degrees. The useful deflection angle is less than half the GLS, though the crosstalk phenomenon referred to above will limit the angular scanning range further.

In theory, crosstalk between neighboring guide layers would be expected to be a serious problem if the radiation is propagating "synchronously", i.e. with neighboring phase fronts travelling at the same speed. In practice, the operation of the device does not seem to be well described by the synchronous model, and the effect of neighboring guides shows up as random-phase noise, rather than as coherent interference.

If only one mode is acceptable in the guiding layer, then the region of interest is the lowest horizontal band in the center. This gives a fill factor of about ¼, deflection angles of about 20 degrees and angle between the first lobe and the main lobe of less than 30 degrees. The large dot indicates the embodiment illustrated in FIG. 1. If two modes can be tolerated within the guiding layer, then the block immediately above the FIG. 1 embodiment is available. The presence of two modes offers the possibility that suitable dimensioning can be arranged so that the $TE_1$ mode will not be excited, i.e., it will be below a threshold but as a consequence of the dimensions there will be greater "capacity" for the first $TE_0$. The reason why the higher mode is less able to be excited is that its parity would not match the parity of the incoming beam. The required limitations on the guide thickness and index step for such a two mode embodiment tend to conflict for requirements of other effects which result in the one mode design being simpler to implement.

At 10.6 microns, the electron carrier concentration resulting from the baseline configuration was much greater than the optimum amount. In order to avoid modification of other parameters, the amount of available electrons was reduced by doping the guide layers with TEOV (triethyloxyvanadyl) in a conventional manner. The concentration of TEOV was determined by the requirement that the P-N junction between neighboring boundary layers completely deplete the guide layer. A set of parameters for the embodiment of FIG. 1 is contained in table I.

The layers were grown in steps, stopping on a GaAs layer to prevent the growth of oxide on an AlGaAs layer because it is very difficult to make electrical contact to the AlGaAs with such an oxide layer is present.

The growth of semi-insulating films of GaAs by the MOCVD process was not practical before the publication of the work of Akiyama, et al., J. Crystal Growth, 68, 39 (1984), which reported that triethoxyvanadyl [$VO(OC_2H_5)_3$] can be employed as an effective dopant which does not exhibit a memory effect. No data was presented on the physical properties of this material, nor were any caveats raised with regard to potential problems that must be addressed before TEOV can be used effectively without encountering any unexpected surprises.

A conventional vertical reactor having a diameter of 89 mm was used to develop improved parameters for GaAs growth in thick layers. In order to make effective improvements, three requirements must be addressed. The first and most important is the suppression of particulate fallout onto the substrate from nonadherent reactor wall deposits, since particulates will result in highly disturbed growth destroying the integrity of the device structure. The second is the suppression of particulates generated in the gas manifold which can reach the substrate during growth and lead to regions of locally disturbed growth resulting in scattering losses in the guided wave structures The third is arriving at the proper growth parameters that will suppress nucleation and growth of crystallographic defects that lead to further degradation of the surface morphology.

The metallorganic precursors employed in the MOCVD process are extremely reactive, and the presence of moisture in the system, wall reactions, and reactions between the precursors in the manifold, will lead to particulate generation. For example, the reaction of trimethylaluminum (TMAL) with moisture will lead to generation of alumina particulates. Similarly, the reaction of TMAL with hydrogen selenide will not only deplete the N-type dopant source but will also form AlSe particles.

Commercial gas-line filters were used to remove particles found in the storage vessels and lines. Proper conditioning is important so that the filter does not serve as a source of moisture which would react with the highly reactive metal organic (MO) and hydride sources employed as precursors in the growth process. Some manufacturers use epoxy in the construction of their filters which results in a near endless supply of moisture rendering them useless for this application. The best gasoline filters for this application were found to be manufactured by Millipore. These are constructed of Teflon ® and do not exhibit any tendency to react with the MO or hydride sources employed. Physisorbed moisture is readily removed from the filters by heating to 90° C. and purging with purified gas for an extended period of time. The filters used were rated to remove particulates as small as 0.02 μm.

Initially, a common filter for all sources was employed, but this led to rapid clogging of the filter. The triethoxyvanadyl was believed to be the primary cause. It is an oxygen bearing compound and exhibits a low vapor pressure as well. This would lead to physisorbed TEOV in the filter and subsequent reaction with the MO sources, generating solid particulates which then clog the filter. The gas manifold underwent a series of modifications before an acceptable configuration was arrived at in which reactions between the precursors were suppressed. In its final form, the manifold used individual filters for each precursor with the exception of TEOV, which tended to clog the filter in a short period of time. This is a consequence of the fact that it exhibits a low vapor pressure as well as a high viscosity. The filters were located in each line at a point just prior to the introduction the precursor into the input manifold. The TEOV was introduced separately into the reactor downstream of the input manifold. This arrangement was found to be very effective, and the frequency of filter changes required to keep the system operating at peak performance were typically of the order of once every six months.

Nonadherent wall deposits can result in very gross structural defects. The thicker the layer growth required, the greater the probability that particulate fallout will be a problem when dealing with thick layer growth employing a conventional MOCVD system. In order to grow thick, defect free, epitaxial, multiple-waveguide structures (100 to 1000 μm), it was necessary to develop a means by which wall deposits could be suppressed or their adherence enhanced.

It is well known that at elevated temperatures GaAs will decompose unless maintained under an arsenic over-pressure. Therefore, at the start of a growth run the GaAs substrate is maintained under an arsine ambient, while being heated to the growth temperature. During this cycle which typically lasts about 20 to 30 minutes, a deposit of arsenic will build up on the walls of the reactor. It was suspected that this initial arsenic buildup did not bond well to the quartz walls of the reactor and so led to the poor adherence of the subsequent wall deposits. The arsenic flow during the heat-up cycle is usually the same as that employed during growth, and is far in excess of that required to prevent the loss of arsenic from the substrate. This realization led to reducing the arsine flow rate during substrate heating and resulted in a dramatic increase in the adherence of wall deposits. Epitaxial layer thicknesses of 100 μm have been achieved with only slight evidence of a few defects stemming from non-adherent wall deposits occurring in the latter stage of growth. The configuration of the atmospheric pressure reactor was a vertical quartz tube having an internal bore of 89 mm and jacketed for water cooling of the reactor walls. An inductively heated silicon carbide coated graphite susceptor was used for substrate heating. The reactants were introduced through a diffuser located at the top of the chamber. A commercially available reactor suitable for this process is the EMCORE GS-3200, available from the Emcore corporation.

Initially, the growth of GaAs epitaxial layers was carried out employing a conventional V/III ratio of 11.7:1 (As:Ga) and growth temperature of 650° C. These conditions, used for the growth of thin epitaxial structures, produced films with excellent surface morphology. As the film thickness requirements increased, the surface morphology tended to degrade with the appearance of macroscopic crystallographic defects. The defects occur as slightly raised elongated regions approximately 60×150 μm in size and have the appearance of "footprints". These regions sometimes have inclusions of polycrystalline material. If one cleaves through one of the "footprints" and examines the specimen in cross-section, a structurally disturbed region of significant extent is found. Associated with these regions are dislocations, polycrystalline regions, and stacking faults. One can clearly see the jog that occurs in the waveguide region of the modulator structure associated with the "footprint" defect. It was necessary to increase the V/III ration to 20:1 and the substrate temperature to 700° C. in order to eliminate the occurrence of these "footprints" in the GaAs growth. The best surface morphology for the growth of the 30 percent AlGaAs buffer layers was obtained with a V/III ratio of 10.0:1 and a substrate temperature of 650° C.

The conditions for inserting TEOV described by Akiyama were initially used (bubbling hydrogen through the TEOV at a bubbler temperature 10° C. and a carrier gas flow rate of 10 standard cubic centimeters per minute (sccm)), but it was found that in order to produce semi-insulating GaAs films ($\sim 10^8$ ohm-cm) in our system, it was necessary to raise the source temperature to 20° C. and the carrier gas flow rate to 100 sccm. A number of unexpected problems developed, such as: a) loss in the effectiveness of TEOV doping to continue to produce semi-insulting GaAs films; b) inability to grow N-doped 30 percent AlGaAs buffer layers following growth of TEOV doped guide layers; and c) excessive failure of check valves in the TEOV exhaust lines. TEOV hydrolyzes rapidly, resulting in a deep red color change from the initial orange color of freshly distilled material. Complete hydrolysis yields solid yellow $V_2O_5$ and ethanol. "Old" TEOV kept under hydrogen at room temperature goes from orange to green and eventually black without an accompanying solid product. It is suspected that this is due to a slow dimerization and eventually a polymerization product. This thermal instability can be minimized by maintaining TEOV at subambient conditions when not being processed or when not in use between CVD processing runs. We have maintained samples of TEOV at 0° C. for more than a year with no evidence of dimerization and have, therefore, lowered the TEOV bath temperature in our CVD system to 0° C. between runs. TEOV which shows evidence of dimerization or polymerization can be reclaimed simply by redistillation and results in the recovery of 99 percent of the product. The dimerization results in a significant decrease in the delivery rate of the TEOV, thus accounting for the loss in doping efficiency as the material ages while kept at room temperature. Although TEOV is a metal organic compound, its vapor pressure is significantly lower than that of conventional MO sources such as TMG and TMAL. The presence of the dimer product results in an increase in surface tension of this low vapor pressure liquid resulting in an effective lowering of the vapor pressure and hence a reduction in the delivery rate. The TEOV is maintained in a stainless steel bubbler and is not subject to a visual check. Periodic analysis of the TEOV is performed by checking the delivery rate by bubbling the transported TEOV through a dilute solution of HCl and performing an ICP analysis to determine the vanadium content.

In experiments conducted to determine a delivery schedule for a series of carrier gas flow rates and TEOV bubbler temperatures, it was realized that TEOV exhibited a great tendency to coat the walls of the stainless steel transfer lines. This means that a low vapor pressure liquid such a TEOV will persist, after it is used in a run, to grow a semi-insulating guide layer and will lead to compensation in the subsequent growth of the N-type 30 percent AlGaAs buffer layer. Employing SIMS (secondary ion mass spectroscopy) analysis, it was determined that the affinity of AlGaAs for oxygen during TEOV doping is three orders of magnitude greater than that of GaAs. Oxygen acts as a deep level in AlGaAs and it is understandable that the subsequent AlGaAs layers grown would be compensated. The final approach involved employing heated delivery lines to prevent absorption of TEOV, shifting the point of introduction of the TEOV into the reactor downstream from the input of the MO precursors, and adding valving to permit reverse flushing of the input TEOV line prior to starting growth of the doped AlGaAs layers following TEOV doping.

There was a conventional bypass around the reactor in the TEOV line, so that the TEOV could be stabilized before it was passed into the reactor. TEOV that was bypassed was transferred to a conventional burn box. The failure of the check valve in this TEOV bypass exhaust line was solved by heating the check valve. Finally, clogging of the TEOV exhaust line due to decomposition of the TEOV at the exit into the burn box was handled by introducing a cold trap in the bypass line before the exit to remove the offending TEOV. The knowledge assimilated on the properties of TEOV coupled with the necessary system modifications has led to successful trouble-free use of TEOV to produce semi-insulating films as well as its use as a compensating agent to product films meeting requirements for applications requiring low background carrier concentration material.

The flow parameters, and source and substrate temperatures, established for GaAs and 30 percent AlGaAs growth, are tabulated in Table V. The TMG and TMAL were maintained in temperature controlled baths as specified and transported by a hydrogen carrier gas at the flow listed in the table. In addition to the parameters shown there, when a GaAs guide layer is grown, TEOV is added by passing $H_2$ through a bubbler at 20 sccm. The hydrogen flow rate through the TEOV buffer and the other TEOV parameters are adjusted to provide a fully depleted guide layer, which is taken to mean a free election concentration of about $5 \times 10^{12}$, within a factor of 2 for a 5 micron thick waveguide. Other waveguides with different thickness will require a different concentration that may readily be calculated from standard texts. TEOV much in excess of that amount will increase the optical absorption in the waveguide, so the amount of TEOV should be close to the minimum required for depletion. For semi-insulating GaAs layers, the TEOV mixture will be adjusted such that the resistivity is greater than about $10^8$ ohm-cm. In the doped $Al_xGa_{1-x}As$ layers, dimethyl zinc was employed as a P-dopant and hydrogen selenide as an N-dopant.

At the start of a growth run, an arsenic ambient must be provided to prevent arsenic loss from the substrate during heat up to the growth temperature. This is accomplished by the Thermal decomposition of arsine (10% $AsH_3$ in $H_2$) which is introduced into the reactor at a rate of 100 sccm. This flow rate is one fifth that required for the growth of GaAs. It is important to reduce the flow to minimize the build-up of arsenic wall deposits prior to the initiation of GaAs growth. Higher flow rates will only lead to an excessive build-up of arsenic on the reactor walls resulting in the formation of poorly adherent wall deposits and to generating of particulates leading to highly defected growth. The layers of GaAs were grown by the MOCVD (metal organic chemical vapor deposition) process using TEOV doping to introduce traps which reduced carrier concentration to a level low enough for complete depletion of the guide layer under zero bias. Since the TEOV lowers the conductivity of the guide layers, they will be referred to for the purposes of this disclosure as being semi-insulating, or undoped, or not intentionally doped, reserving the term "dopant" for n- and p-type dopants. Parameters for growing the GaAs and AlGaAs are illustrated in table V.

In order to have improved ohmic contact and reduced resistance an option is desirable to insert a heavily doped layer 115 within each of the buffer layers 110. This layer 115 might be 1 to 2 microns in thickness and have an increased doping concentration of the same dopant. Suitable concentration is about $10^{18}$. Another means for reducing resistance is the growth of a layer of an intermetallic such as nickel aluminide in the buffer layer.

Another embodiment was designed to operate at 0.85 microns. The parameters for a baseline configuration are presented in Table II, with the concentration parameters for a three-guide structure being presented in Table III. Note that the nominally undoped guide layers have a finite dopant concentration from material remaining in the system from the previous layer. Since the concentration is down from that of the intentionally doped layers by a factor of 100, the performance is adequate. A parameter map for the 0.85 micron baseline embodiment is shown in FIG. 5.

It should be understood that the invention is not limited to the particular embodiments shown and described herein, but that various changes and modifications may be made without departing from the spirit and scope of this novel concept as defined by the following claims.

TABLE I

CALCULATED OR THEORETICAL BASELINE PARAMETERS 10.6 μm

| | | |
|---|---|---|
| Geometrical | | |
| Guide Thickness | d | 4.5 μm |
| Buffer Thickness | b | 13.5 μm |
| Periodicity | t | 18.0 μm |
| Length | l | 2.0 cm |
| Height | h | 1.0 cm |
| Material | | |
| Guide | GaAs | |
| Buffer | $Al_xGa_{1-x}As$ | x = 0.3 |
| Doping & Carrier Concentration | | |
| Guide | SI, compensated | none |
| Buffer | P or N-type | $1 \times 10^{16}$ cm$^{-3}$ |
| Optical | | |
| Wavelength | λ | 10.6 μm |
| Guide Index | $n_g$ | 3.268 |
| Buffer Index | $n_b$ | 3.091 |
| Modal | | |
| Dominant Mode | $TE_o$ | |
| Parity | even (+) | |
| Longitudinal Prop. Const. | β | 1.8963 μm$^{-1}$ |
| Tranverse Prop. Const. | K | 0.3957 μm$^{-1}$ |
| Exponential Decay Const. | γ | 0.4888 μm$^{-1}$ |
| Fractional Power in Guide | $f_g$ | 0.8115 |
| Fractional Power in Buffer | $f_b$ | 0.1885 |
| Coupling | | |
| Coupling Constant | c | 0.32 cm$^{-1}$ |
| Coupling Length | L | 4.85 cm |
| Deflection (+ or −) | | |
| Maximum Angle | $\Theta_{max}$ | 10.1 deg |
| Grating Lobe Separation | gls | 36.1 deg |
| Electrical | | |
| Buffer Mobility | $\mu_b$ | 2830. cm$^2$/Vsec |
| Eff. Guide Capacitance | C | 5.1 pf |
| Eff. Buffer Resistance | R | 43 ohms |
| Response Time | τ | 0.5 μsec |
| Bandwidth | B | 4.6 Mz |
| Transmission | | |
| Guide Absorption Coef. | $a_g$ | 0 dB cm$^{-1}$ |
| Buffer Absorption Coef. | $a_b$ | 4.1 dB cm$^{-1}$ |
| Effect. Absorption Coef. | $a_{eff}$ | 0.77 dB cm$^{-1}$ |
| Effect. Mode Transmission | T | 0.70 |

TABLE II

CALCULATED OR THEORETICAL BASELINE PARAMETERS .85 μm

| | | |
|---|---|---|
| Geometrical | | |
| Guide Thickness | d | 0.5 μm |

TABLE II-continued

CALCULATED OR THEORETICAL BASELINE PARAMETERS .85 μm

| | | |
|---|---|---|
| Buffer Thickness | b | 1.5 μm |
| Periodicity (d + b) | t | 2.0 μm |
| Length | l | 1.0 cm |
| Width | h | 1.0 cm |
| Material | | |
| Guide | $Al_xGa_{1-x}As$ | x = 0.2 |
| Buffer | $Al_yGa_{1-y}As$ | y = 0.4 |
| Doping & Carrier Concentration | | |
| Guide | SI, compensated | low |
| Buffer | P or N-type | $1 \times 10^{17}$ cm$^{-3}$ |
| Optical | | |
| Wavelength | A | 0.85 μm |
| Guide Index | $n_g$ | 3.466 |
| Buffer Index | $n_b$ | 3.351 |
| Electro-Optical | | |
| Crystal Growth Direction | | [001] |
| Crystal Propagation Direction | | [110] |
| Electro-Optic Figure of Merit | $n_0^3 \Gamma_{41}$ | $6.7 \times 10^{-9}$ cm/V |
| 2π Voltage | $V_{2\pi}$ | 1.3 band gap |
| Breakdown Voltage | $V_b$ | 20 band gap |
| Modal | | |
| Dominant Mode | $TE_o$ | |
| Parity | | even (+) |
| Longitudinal Prop. Const. | β | 25.3337 μm$^{-1}$ |
| Tranverse Prop. Const. | K | 3.8039 μm$^{-1}$ |
| Exponential Decay Const. | δ | 5.3274 μm$^{-1}$ |
| Fractional Power in Guide | $f_g$ | 0.8553 |
| Fractional Power in Buffer | $f_b$ | 0.1447 |
| Coupling | | |
| Coupling Constant | c | 0.55 cm$^{-1}$ |
| Coupling Length | L | 2.86 cm |
| Deflection (+ or −) | | |
| Maximum Angle | $\Theta_{max}$ | 8.0 deg |
| Electrical | | |
| Buffer Mobility | $\mu_b$ | 920 cm$^2$/Vsec |
| Eff. Guide Capacitance | C | 23 pf |
| Eff. Buffer Resistance | R | 240 ohms |
| Response Time | τ | 12 μs |
| Bandwidth | B | 180 kHz |
| Transmission | | |
| Guide Absorption Coef. | $\alpha_g$ | 0 dB cm$^{-1}$ |
| Buffer Absorption Coef. | $\alpha_b$ | 3 dB cm$^{-1}$ |
| Effect. Absorption Coef. | α | 0.4 dB cm$_{-1}$ |
| Effect. Mode Transmission | T | 0.9 |

TABLE III

Experimental layer parameters 0.85 μm

| Layer | Composition x | Thickness (μm) | Carrier Density (cm$^{-3}$) |
|---|---|---|---|
| p cap | 0 | 0.4 | p = 1-2 × 10$^{18}$ (graded) |
| P 2 | 0.43 | 1.5 | P = 1.8 × 10$^{17}$ |
| U 3 | 0.23 | 0.5 | N < 3 × 10$^{15}$ |
| N 2 | 0.45-0.40 | 1.5 | n = 1.2 × 10$^{17}$ |
| U 2 | 0.22 | 0.5 | P = < 4 × 10$^{15}$ |
| P 1 | 0.41-0.40 | 1.5 | P 1 × 10$^{17}$ |
| U 1 | 0.22 | 0.5 | N 3 × 10$^{15}$ |
| N 1 | 0.42 | 1.5 | N = 1.8 × 10$^{17}$ |
| l buffer | 0 | 1.5 | n ≤ 2 × 10$^{17}$ |
| l + substrate | 0 | — | n ~ 10$^{18}$ |

Numbers after P, U, and N identify which N, P or U layer is being discussed.
U = undoped (guide)
P, N = buffer or clad layer

TABLE IV

Experimental layer parameters 10.6 μm

| Layer | Thickness/Type (microns) | Carrier Conc. (/cm$^3$) | Doping |
|---|---|---|---|
| N+ | 0.7 GaAs | 2.5 × 10$^{17}$ | |
| N | 15. 27% AlGaAs | >10$^{15}$ | Se |
| U | 6.0 GaAs | compensated | TE0V |
| P | 19. 27% AlGaAs | 5-8 × 10$^{16}$ | Zn |
| U | 5.0 GaAs | compensated | TE0V |
| N | 20. 27% AlGaAs | >10$^{15}$ | Se |
| N+ | 0.7 GaAs | 2.5 × 10$^{17}$ | |
| N+ substrate | 10$^{18}$ | | |

TABLE V

| | GaAs | 30% AlGaAs |
|---|---|---|
| Hydrogen | 3000 sccm | 3000 sccm |
| AsH$_3$(10% AsH$^2$ + H$^2$) | 500 sccm | 250 sccm |
| TMG 0° C. | 25 sccm | 22 sccm |
| TMAL 24° C. | — | 22 sccm |
| Growth Temperature | 700° C. | 650 |
| V/III | 20 | 10 |

*Standard cubic centimeter per minute (sccm)

I claim:

1. A device for manipulating an optical beam travelling along a first axis comprising:

at least one linear array of controllable guide channels formed of an electro-optically active material disposed perpendicular to a first transverse axis and parallel to said first axis to intercept said optical beam, each of said array of controllable guide channels being bracketed along said first transverse axis by a set of electrodes;

means to alter the phase of radiation passing through each of said controllable guide channels with a predetermined phase relationship between consecutive channels by the imposition of a predetermined electric field through said electro-optically active channel material, whereby the far-field pattern of said optical beam may be manipulated by imposition of a predetermined set of phase relationships on said controllable guide channels, characterized in that:

consecutive controllable guide channels are formed of an undoped semiconductive material and are separated by a doped layer of conductive semiconductive material, consecutive layers of said conductive semiconductive material being doped with opposite polarity to form a P-I-N junction with said undoped semiconductive material; and said means to alter the phase includes means for imposing a predetermined electric field in a direction to reverse-bias said P-I-N junction, and having a magnitude sufficient to form a depletion region extending throughout said controllable guide channel and to impose a predetermined optical phase shift on optical radiation passing through said undoped semiconductive material.

2. A device for manipulating an optical beam travelling along a first axis comprising:

at least one linear array of controllable guide channels formed of an electro-optically active material disposed perpendicular to a first transverse axis and parallel to said first axis to intercept said optical beam, each of said array of controllable guide channels being bracketed along said first transverse axis by a set of electrodes;

means to alter the phase of radiation passing through each of said controllable guide channels with a predetermined phase relationship between consecutive channels by the imposition of a predetermined electric field through said electro-optically active channel material, whereby the far-field pattern of said optical beam may be manipulated by imposition of a predetermined set of phase relationships on said controllable guide channels, characterized in that:

consecutive controllable guide channels are formed of an undoped semiconductive material and are separated by a doped layer of conductive semiconductive material, consecutive layers of said conductive semiconductive material being doped with opposite polarity to form a P-I-N junction with said undoped semiconductive material;

said means to alter the phase includes means for imposing a predetermined electric field in a direction to reverse-bias said P-I-N junction, and having a magnitude sufficient to form a depletion region extending throughout said controllable guide channel and to impose a predetermined optical phase shift on optical radiation passing through said undoped semiconductive material; and said controllable guide channels contain a predetermined quantity of a predetermined trap material for trapping free electrons and reducing the concentration of free electrons in said controllable guide channel below a predetermined amount.

3. A device according to claim 2, further characterized in that said predetermined quantity of trap material is sufficient to fully deplete said controllable guide channels when said predetermined electric field in said controllable guide channels is substantially zero.

4. A device according to claim 3, further characterized in that said trap material includes vanadium.

5. A device according to claim 1, further comprising optical beam relay means for relaying said optical beam with a predetermined polarization rotation about said first axis; and a second linear array of controllable guide channels disposed along a second transverse axis and having second means to alter the phase of radiation passing through each of said second linear array of controllable guide channels with a predetermined phase relationship between consecutive channels by the imposition of a predetermined electric field through said electro-optically active channel material, said optical beam relay means being disposed along said first axis between said first and second linear arrays and being adapted to pass optical radiation emerging from said first linear array into said second linear array with said predetermined polarization rotation, whereby said optical beam may be manipulated along both of said first and second transverse axes, further characterized in that: consecutive controllable guide channels of said second linear array are formed of an undoped semiconductive material and are separated by a doped layer of conductive semiconductive material, consecutive layers of said conductive semiconductive material being doped with opposite polarity to form a P-I-N junction with said undoped semiconductive material; and said second means to alter the phase includes second means for imposing a predetermined electric field in a direction to reverse-bias said P-I-N junction, and having a magnitude sufficient to form a depletion region extending throughout said controllable guide channel and to impose a predetermined optical phase shift on optical radiation passing through said undoped semiconductive material.

6. A device according to claim 5, further characterized in that said controllable guide channels contain a predetermined quantity of a predetermined trap material for trapping free electrons and reducing the concentration of free electrons in said controllable guide channel below a predetermined amount.

7. A device according to claim 6, further characterized in that said predetermined quantity of trap material is sufficient to fully deplete said controllable guide channels when said predetermined electric field in said controllable guide channels is substantially zero.

8. A device according to claim 7, further characterized in that said trap material includes vanadium.

* * * * *